United States Patent
Ikuta

(10) Patent No.: US 9,876,404 B2
(45) Date of Patent: Jan. 23, 2018

(54) ROTOR OF ROTATING ELECTRICAL MACHINE

(71) Applicant: DENSO CORPORATION, Kariya, Aichi-pref. (JP)

(72) Inventor: Hiroyuki Ikuta, Anjo (JP)

(73) Assignee: DENSO CORPORATION, Kariya (JP)

(*) Notice: Subject to any disclaimer, the term of this patent is extended or adjusted under 35 U.S.C. 154(b) by 344 days.

(21) Appl. No.: 14/830,891

(22) Filed: Aug. 20, 2015

(65) Prior Publication Data

US 2016/0056677 A1    Feb. 25, 2016

(30) Foreign Application Priority Data

Aug. 20, 2014  (JP) .................. 2014-167136

(51) Int. Cl.
| | |
|---|---|
| *H02K 1/28* | (2006.01) |
| *H02K 1/22* | (2006.01) |
| *H02K 1/27* | (2006.01) |

(52) U.S. Cl.
CPC .............. *H02K 1/28* (2013.01); *H02K 1/276* (2013.01)

(58) Field of Classification Search
CPC ............ H02K 1/24; H02K 1/28; H02K 1/276; H02K 1/274
See application file for complete search history.

(56) References Cited

U.S. PATENT DOCUMENTS

| | | | | |
|---|---|---|---|---|
| 2,493,102 A * | 1/1950 | Brainard | ............... | H02K 1/276 |
| | | | | 164/109 |
| 3,204,134 A * | 8/1965 | Schneider | ............... | H02K 1/28 |
| | | | | 310/216.121 |
| 3,477,125 A * | 11/1969 | Schwartz | ............... | H02K 1/28 |
| | | | | 29/507 |
| 4,377,762 A * | 3/1983 | Tatsumi | ................... | H02K 1/28 |
| | | | | 29/520 |
| 6,448,683 B2 * | 9/2002 | Wiesler | .................. | H01R 39/16 |
| | | | | 310/235 |
| 7,977,846 B2 * | 7/2011 | Ishida | .................... | H02K 1/243 |
| | | | | 310/216.116 |
| 8,008,834 B2 * | 8/2011 | Gas | ........................... | H02K 1/28 |
| | | | | 310/194 |
| 8,963,387 B2 * | 2/2015 | Yasuda | .................... | H02K 1/28 |
| | | | | 310/156.09 |
| 9,124,156 B2 * | 9/2015 | Ikuta | ..................... | H02K 1/2706 |

(Continued)

FOREIGN PATENT DOCUMENTS

| | | | | |
|---|---|---|---|---|
| JP | 57052335 A | * | 3/1982 | .............. H02K 1/28 |
| JP | H02-294241 A | | 12/1990 | |
| JP | H11-69675 A | | 3/1999 | |

*Primary Examiner* — Edgardo San Martin
(74) *Attorney, Agent, or Firm* — Oliff PLC

(57) ABSTRACT

The rotor includes a shaft, and a rotor core that is fitted and fixed to the shaft. The shaft includes a knurled portion on an end side and a small-diameter portion formed in a tip side via a first stepped surface. The rotor core includes a small diameter hole formed in a tip side end portion of the fitting hole press-fitted onto the small diameter portion, a large diameter hole formed in an end side of the small diameter hole via a second stepped surface, and a press-fitting portion press-fitted onto the knurled portion and is formed on an end side end portion of the large diameter hole. A space part is disposed between the first stepped surface and the second stepped surface.

5 Claims, 2 Drawing Sheets

(56) References Cited

U.S. PATENT DOCUMENTS

| | | | |
|---|---|---|---|
| 9,608,485 B2* | 3/2017 | Yamagishi | H02K 1/2766 |
| 2006/0138894 A1* | 6/2006 | Harada | H02K 1/28 |
| | | | 310/216.004 |
| 2008/0079330 A1* | 4/2008 | Ishida | H02K 1/243 |
| | | | 310/263 |
| 2008/0315714 A1* | 12/2008 | Badey | H02K 1/243 |
| | | | 310/261.1 |
| 2013/0127283 A1* | 5/2013 | Matsumoto | B60Q 5/008 |
| | | | 310/156.11 |
| 2014/0265699 A1* | 9/2014 | Morikawa | H02K 1/278 |
| | | | 310/156.21 |
| 2015/0137650 A1* | 5/2015 | Takahashi | H02K 1/2766 |
| | | | 310/156.56 |
| 2015/0357869 A1* | 12/2015 | Ikuta | H02K 1/28 |
| | | | 310/45 |
| 2015/0369248 A1* | 12/2015 | Noguchi | B29C 70/682 |
| | | | 417/420 |
| 2016/0065014 A1* | 3/2016 | Bott | H02K 1/274 |
| | | | 310/156.01 |
| 2016/0261158 A1* | 9/2016 | Horii | H02K 1/32 |
| 2016/0315526 A1* | 10/2016 | Kaneshige | H02K 1/28 |
| 2016/0352166 A1* | 12/2016 | Kim | H02K 1/276 |
| 2016/0352167 A1* | 12/2016 | Kim | H02K 1/276 |
| 2016/0352199 A1* | 12/2016 | Honda | H02K 15/12 |
| 2017/0033647 A1* | 2/2017 | Aso | H02K 29/08 |
| 2017/0070127 A1* | 3/2017 | Matsumoto | H02K 1/28 |
| 2017/0141628 A1* | 5/2017 | Nose | B21D 28/26 |

\* cited by examiner

ROTOR OF ROTATING ELECTRICAL MACHINE

This application is based on and claims the benefit of priority from earlier Japanese Patent Application No. 2014-167136 filed Aug. 20, 2014, the description of which is incorporated herein by reference.

TECHNICAL FIELD

The present disclosure relates to a rotor of a rotating electrical machine used as a motor or a generator mounted on a vehicle such as a hybrid vehicle or an electric vehicle, for example.

BACKGROUND

Conventionally, as a rotating electrical machine used and mounted on a vehicle, a field rotating type synchronous motor (hereinafter, referred to as an IPM motor) with a structure that permanent magnets are embedded inside a rotor is known.

Since it is possible to utilize both reluctance torque by magnetization of the rotor and torque by magnetization of the permanent magnets, the IPM motor is highly efficient and thus preferably employed in a hybrid vehicle or an electric vehicle, etc.

Such an IPM motor includes a stator that functions as an armature and a rotor that functions as a field system disposed so as to face the stator in a radial direction.

In Japanese Patent Application Laid-Open Publication No. 2-294241, there is disclosed a rotor that includes a shaft (rotational shaft) having a knurled portion formed on an outer peripheral surface thereof, and a rotor core having a fitting hole that is fitted and fixed to the knurled portion of the shaft by press-fitting.

In addition, in Japanese Patent Application Laid-Open Publication No. 11-69675, there is disclosed a rotor (field winding type rotor) that includes a shaft having a knurled portion formed on an outer peripheral surface thereof and a stepped portion formed on an axial end portion, a rotor core (cylindrical core) fitted and fixed to the knurled portion of the shaft, and a collar that is fitted and fixed by press-fitting to another axial end portion of the shaft.

Incidentally, in the case of the Publication No. 2-294241, foreign matter such as shavings of a press section occurs when the rotor core is fitted and fixed by press-fitting to the knurled portion of the shaft.

Since this foreign matter is scattered by centrifugal force during a rotation of the rotor, this may reduce insulation properties due to damage to stator windings, a cleaning process is required, and it becomes a reason for causing high cost.

Moreover, even in the case of the Publication No. 11-69675, foreign matter such as shavings of a press section occurs when the rotor core is fitted and fixed by press-fitting to the knurled portion of the shaft.

Therefore, when the collar is press-fitted to the other axial end portion of the shaft, the foreign matter would be caught, and a problem of lowering a press-fixing force, or a problem that the collar cannot be pressed into a predetermined position may arise.

In addition, in the case of Publication No. 11-69675, the number of parts increases due to the use of the collar, and there is also a problem of it being higher in cost.

SUMMARY

An embodiment provides a rotor of a rotating electrical machine that can prevent foreign matter such as shavings occurring when a rotor core is fitted and fixed by press-fitting to a knurled portion of a shaft from scattering during a rotation of the rotor.

A rotor of a rotating electrical machine according to a first aspect includes a shaft having a knurled portion formed by applying knurling on an outer peripheral surface of the shaft, and a rotor core having a fitting hole that is fitted and fixed onto the outer peripheral surface of the shaft.

Defining a direction that the shaft is inserted into the fitting hole of the rotor core in an axial direction as a shaft inserting direction, the shaft includes the knurled portion on an end side in the shaft inserting direction, and the shaft includes a small diameter portion having a smaller diameter than a diameter of the knurled portion disposed in a tip side in the shaft inserting direction of the knurled portion via a first stepped surface.

The rotor core includes a small diameter hole formed in a tip side end portion in the shaft inserting direction of the fitting hole and the small diameter hole is press-fitted onto the small diameter portion of the shaft, a large diameter hole having an inner diameter larger than an inner diameter of the small diameter hole and the large diameter hole is disposed in an end side in the shaft inserting direction of the small diameter hole via a second stepped surface, and a press-fitting portion that is press-fitted onto the knurled portion of the shaft and is formed on art end side end portion in the shaft inserting direction of the large diameter hole.

A space part partitioned by an outer peripheral surface of the small diameter portion of the shaft and an inner wall surface of the large diameter hole of the rotor core is disposed between the first stepped surface and the second stepped surface.

According to the disclosure, the space part partitioned by the outer peripheral surface of the small diameter portion of the shaft and the inner wall surface of the large diameter hole of the rotor core is disposed between the first stepped surface of the shaft and the second stepped surface of the rotor core.

Thus, since foreign matter such as shavings occurring due to the knurled portion being scraped are sealed in the space part when the fitting hole of the rotor core is fitted and fixed to the outer circumferential surface of the shaft by press-fitting, no foreign matter is scattered during a rotation of the rotor 1.

Therefore, a cleaning process for removing the foreign matter occurred during the press-fitting is no longer required.

In addition, it is possible to prevent the foreign matter from being caught between the press-fitting portions, and it is possible to improve the quality of the press-fit fixing portions.

Furthermore, since it does not use extra parts such as collars, it is possible to fix the shaft and the rotor core in the circumferential and axial directions while avoiding an increase in the number of parts.

DETAILED DESCRIPTION OF THE PREFERRED EMBODIMENTS

Hereinafter, embodiments of a rotor of a rotating electrical machine according to the present disclosure will be specifically described with reference to the accompanying drawings.

First Embodiment

A rotor of a rotating electrical machine according to the first embodiment will be described with reference to FIGS. 1 and 2.

A rotor 1 of a rotating electrical machine of the first embodiment is used in a rotating electrical machine such as a motor for a vehicle, for example, and is accommodated in a housing of the rotating electrical machine while disposed rotatably on an inner circumferential side of a stator (not shown).

Figure 1:
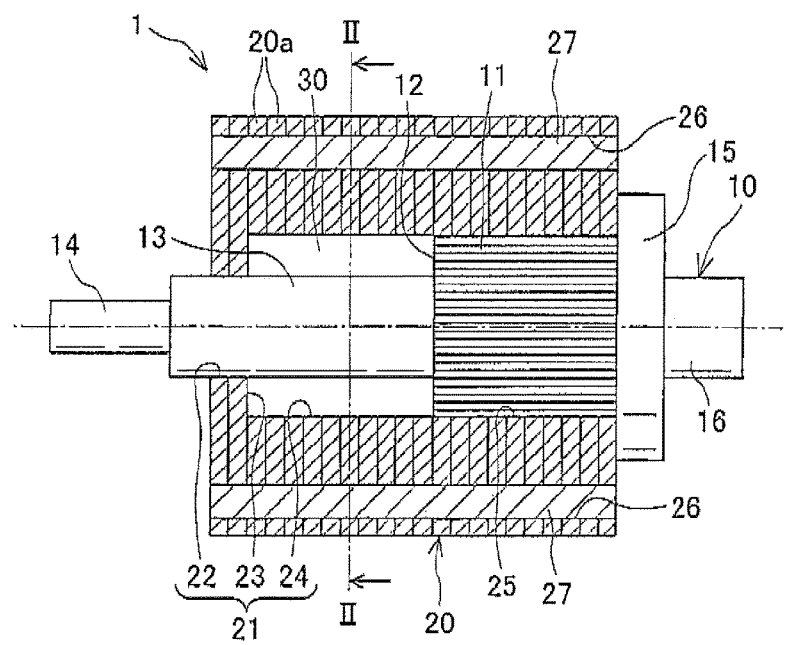
FIG. 1 shows a cross-sectional view along an axial direction of a rotor of a rotating electrical machine according to a first embodiment.
Figure 2:
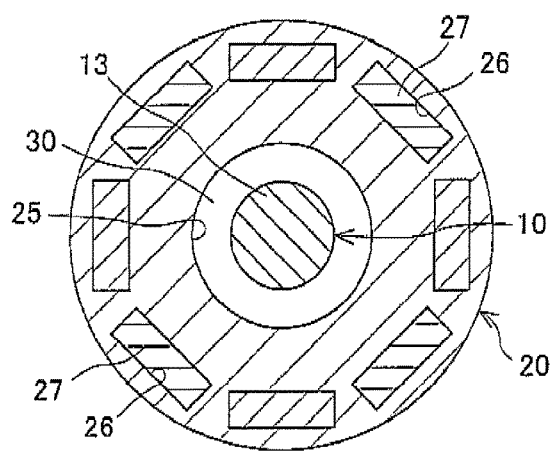
FIG. 2 shows a sectional view taken along the line II-II in FIG. 1.

As shown in FIG. 1, the rotor 1 has a shaft 10 having a knurled portion 11 on an outer circumferential surface thereof, and a rotor core 20 having a fitting hole 21 that is fitted and fixed coaxially onto the outer circumferential surface of the shaft 10.

The shaft 10 is formed in a solid long-sized shaft-like shape made of iron-based metal.

Defining a direction that the shaft 10 is inserted into the fitting hole 21 of the rotor core 20 in an axial direction from the right to the left in FIG. 1 as a shaft inserting direction, a knurled portion 11 is formed by applying knurling on an end side in the shaft inserting direction (right side in FIG. 1) of the shaft 10.

The knurled portion 11 is composed of a plurality of projecting lines and grooves extending in the axial direction formed alternately in a circumferential direction.

The knurled portion 11 is formed in a tapered shape that gradually decreases its diameter toward a tip side (left side in FIG. 1) from the end side in the shaft inserting direction.

A small diameter portion 13 having a smaller diameter than a diameter of the knurled portion 11 is disposed in the tip side in the shaft inserting direction of the knurled portion 11.

A ring-shaped first stepped surface 12 extending in a direction perpendicular to a rotational axis of the shaft 10 is disposed between the knurled portion 11 and the small diameter portion 13.

Then, a tip portion 14 having a smaller diameter than a diameter of the small diameter portion 13 is disposed in the tip side in the shaft inserting direction of the small diameter portion 13.

Further, a ring-shaped flange portion 15 having an outer diameter larger than the diameter of the knurled portion 11 and projecting outwardly in a radial direction is disposed in the end side in the shaft inserting direction of the knurled portion 11.

A rear end portion 16 having substantially the same diameter as the small diameter portion 13 is disposed in an end side in the shaft inserting direction of the flange portion 15.

The rotor core 20 is formed into a cylindrical shape by first laminating a plurality of steel plates 20a, which are formed into a predetermined ring-shape by punching, in the axial direction, and then connecting and fixing the steel sheets 20a by crimping to each steel sheet 20a.

The rotor core 20 has the fitting hole 21 that penetrates in the axial direction and is fitted and fixed onto the outer peripheral surface of the shaft 10.

A small diameter hole 22 that is press-fitted onto the small diameter portion 13 of the shaft 10 is disposed in the tip side end portion in the shaft inserting direction of the fitting hole 21.

An inner diameter of the small diameter hole 22 is slightly smaller than the diameter of the small diameter portion 13.

Thus, since an outer peripheral surface of the small diameter portion 13 and an inner wall surface of the small diameter hole 22 are pressure welded, relative displacements of the shaft 10 and the rotor core 20 in a rotational direction and the axial direction are prevented from occurring.

A large diameter hole 24 having an inner diameter larger than the inner diameter of the small diameter hole 22 is disposed in the end side in the shaft inserting direction of the small diameter hole 22.

A ring-shaped second stepped surface 23 extending in the direction perpendicular to the rotational axis of the shaft 10 is disposed between the small diameter hole 22 and the large diameter hole 24.

Further, a press-fitting portion 25 that is press-fitted onto the knurled portion 11 of the shaft 10 is formed on an inner wall surface of the large diameter hole 24 from a center in the axial direction to the end side end portion in the shaft inserting direction.

An inner diameter of the press-fitting portion 25 is slightly smaller than the diameter of the tip side end portion in the shaft inserting direction of the knurled portion 11.

Thus, projecting tip portions of the knurled portion 11 are engaged with an inner wall surface of the press-fitting portion 25 and are in a state of pressure welding, relative displacements of the shaft 10 and the rotor core 20 in a rotation& direction and the axial direction are prevented from occurring.

In the first embodiment, the inner wall of the large diameter hole 24 of the center in the axial direction to the second stepped surface 23 is opposed at a predetermined distance in the radial direction to the outer peripheral surface of the small diameter portion 13 of the shaft 10.

Further, the first stepped surface 12 of the shaft 10 and the second stepped surface 23 of the rotor core 20 are opposed to each other in the axial direction at a predetermined distance.

That is, a ring-shaped space part 30 partitioned by the outer peripheral surface of the small diameter portion 13 of the shaft 10 and an inner wall surface of the large diameter hole 24 of the rotor core 20 is disposed between the first stepped surface 12 of the shaft 10 and the second stepped surface 23 of the rotor core 20.

The space part 30 is disposed in the tip side in the shaft inserting direction of the knurled portion 11 provided on the shaft 10.

Further, the volume of the space part 30 is set to be sufficiently larger than a press-fitting applying margin volume between the knurled portion 11 of the shaft 10 and the press-fitting portion 25 of the rotor core 20.

A plurality of (8 in the first embodiment) magnet housing holes 26 extending in the axial direction are disposed on an outer periphery of the rotor core 20 in a circumferential direction with a predetermined space therebetween.

A single permanent magnet 27 is embedded into each magnet housing hole 26 so that a plurality of different polarities (8 poles in the first embodiment (N poles: 4, S poles: 4)) alternating magnetic poles in the circumferential direction.

The rotor 1 of the first embodiment is assembled by inserting the tip portion 14 of the shaft 10 in the axial direction from the press-fitting portion 25 side of the large diameter hole 24 of the fitting hole 21 into the rotor core 20.

At this moment, the small diameter portion 13 of the shaft 10 is press-fitted into the small diameter hole 22 of the rotor core 20, while the knurled portion 11 of the shaft 10 is press-fitted into the press-fitting portion 25 of the rotor core 20.

When the knurled portion 11 of the shaft 10 is press-fitted into the press-fitting portion 25 of the large diameter hole 24 of the rotor core 20, foreign matter such as shavings occur due to the knurled portion 11 being scraped.

The foreign matter is pushed into the space part 30 in the tip side in the shaft inserting direction as the press-fitting of the shaft 10 progresses.

Then, when the flange portion 15 of the shaft 10 abuts an end face of the rotor core 20 in the end side in the shaft inserting direction and the press-fitting is completed, the small diameter portion 13 of the shaft 10 being press-fit into the small-diameter hole 22 of the rotor core 20 is also completed, so that the foreign matter being pushed into the space part 30 becomes sealed in the space 30.

According to the rotor 1 of the first embodiment configured as described above, the space part 30 partitioned by the outer peripheral surface of the small diameter portion 13 of the shaft 10 and the inner wall surface of the large diameter hole 24 of the rotor core 20 is disposed between the first stepped surface 12 of the shaft 10 and the second stepped surface 23 of the rotor core 20.

Thus, since the foreign matter such as the shavings occurred due to the knurled portion 11 being scraped are sealed in the space part 30 when the rotor core 20 is fitted and fixed to the outer circumferential surface of the shaft 10 by press-fitting, no foreign matter is scattered during a rotation of the rotor 1.

Therefore, a cleaning process for removing the foreign matter occurred during the press-fitting is no longer required.

In addition, it is possible to prevent the foreign matter from being caught into the press-fitting portions, and it is possible to improve the quality of the press-fit fixing portions.

Furthermore, since it does not use extra parts such as collars, it is possible to fix the shaft 10 and the rotor core 20 in the circumferential and axial directions while avoiding an increase in the number of parts.

Moreover, the rotor core 20 of the first embodiment is formed by the plurality of steel plates 20a being laminated and connected in the axial direction.

Therefore, since it is easy to form the second stepped surface 23 between the large-diameter hole 24 and the small diameter hole 22 of the rotor core 20 by punching the steel plate 20a having the large diameter hole 24 and the steel plate 20a having the small diameter hole 22 with separate inner diameters when forming the steel plate 20a with the predetermined ring shape by punching, the space part 30 can be easily formed.

Further, according to the rotor 1 of the first embodiment, the volume of the space part 30 is set to be sufficiently larger than the press-fitting applying margin volume of the knurled portion 11 of the shaft 10 and the press-fitting portion 25 of the rotor core 20.

Therefore, the foreign matter such as the shavings occurred due to the knurled portion 11 being scraped can be sealed reliably without escaping from the space part 30.

Further, in the first embodiment, the knurled portion 11 of the shaft 10 is formed in the tapered shape that gradually decreases its diameter as reaching toward the tip side from the end side in the shaft inserting direction.

Therefore, since it is possible to ease the fitting force when press-fitting the shaft 10 into the fitting hole 21 of the rotor core 20, it is possible to assemble the shaft 10 and the rotor core 20 easily.

Second Embodiment

Figure 3:
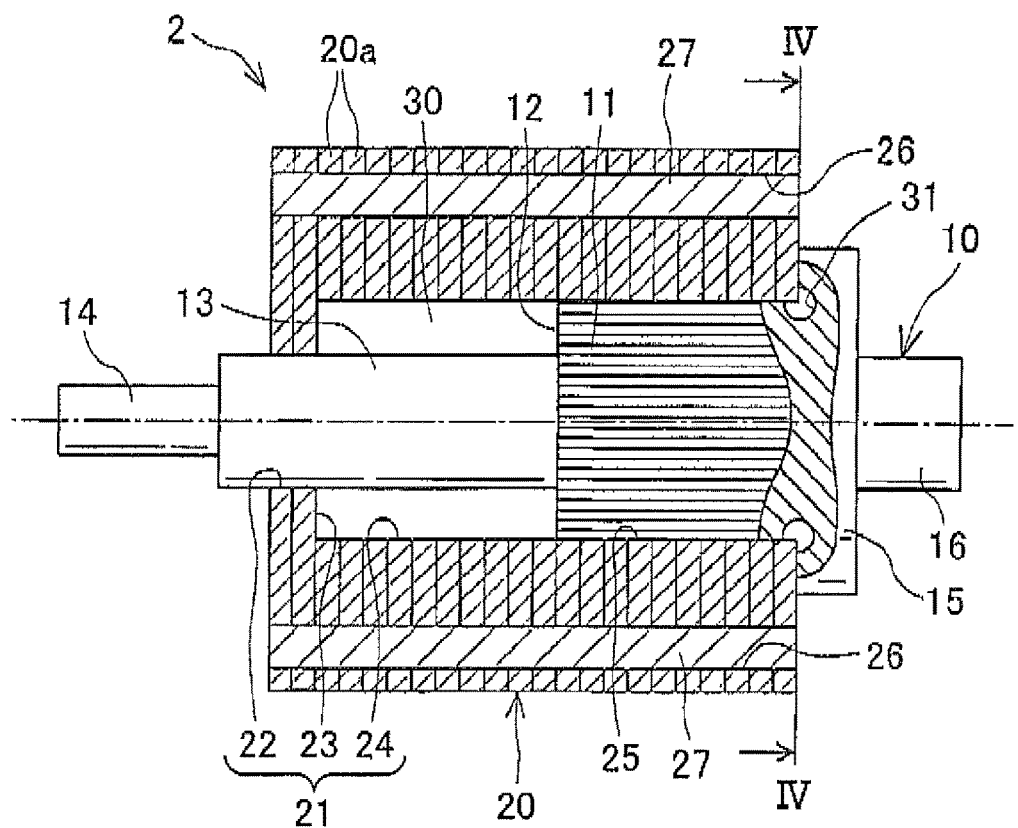
FIG. 3 is a sectional view along the axial direction of the rotor of the rotating electrical machine according to a second embodiment.
Figure 4:
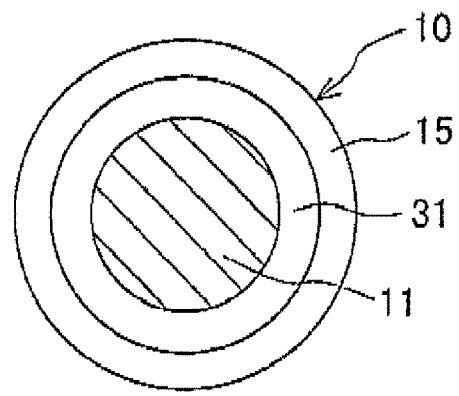
FIG. 4 shows a cross sectional view taken along the line IV-IV of FIG. 3.

A rotor 2 of a rotating electrical machine according to a second embodiment will be described with reference to FIGS. 3 and 4.

Although the rotor 2 of the second embodiment has the same basic configuration with the first embodiment, it differs from the rotor 1 of the first embodiment with a point that a groove-shaped space part 31 formed on the shaft 10 is added.

Therefore, in the second embodiment, components identical with or similar to those in the first embodiment are given the same reference numerals, and structures and features thereof will not be described in order to avoid redundant explanation, and different points and important points will be described.

Similarly to the shaft 10 of the first embodiment, the tip portion 14, the small diameter portion 13, the first stepped surface 12, the knurled portion 11, the flange portion 15, and the rear end portion 16 are disposed in this order from the tip side in the shaft inserting direction (left side in FIG. 3) on the shaft 10 of the second embodiment.

Then, the shaft 10 has the groove-shaped space part 31 formed in the end side end portion in the shaft inserting direction of the knurled portion 11.

That is, the annular groove-shaped space part 31 that goes once around in the circumferential direction is disposed at a corner where an end face in the tip side in the shaft inserting direction of the flange portion 15 and the outer circumferential surface of the knurled portion 11 of the shaft 10 intersects.

The groove-shaped space part 31 has a ring-shaped opening that opens across both the end face in the tip side in the shaft inserting direction of the flange portion 15 and the outer circumferential surface of the knurled portion 11.

It should be noted that the rotor core 20 of the second embodiment is identical to the rotor core 20 of the first embodiment, and therefore a detailed description thereof will be omitted.

Similarly to the rotor 1 of the first embodiment, the rotor 2 of the second embodiment is assembled by inserting the tip portion 14 of the shaft 10 in the axial direction from the press-fitting portion 25 side of the large diameter hole 24 of the fitting hole 21 into the rotor core 20.

At this moment, the small diameter portion 13 of the shaft 10 is press-fitted into the small diameter hole 22 of the rotor core 20, while the knurled portion 11 of the shaft 10 is press-fitted into the press-fitting portion 25 of the rotor core 20.

Then, the foreign matter such as shavings that occurs due to the knurled portion 11 being scraped when the knurled portion 11 of the shaft 10 is press-fitted into the press-fitting portion 25 of the rotor core 20, are pushed into the space part 30 in the tip side in the shaft inserting direction as the press-fitting of the shaft 10 progresses, and the foreign matter becomes sealed in the space 30 when the press-fitting is completed.

At this moment, when fine foreign matter is produced, the fine foreign matter is likely to be pushed to the end side in the shaft inserting direction through the grooves of the knurled portion 11.

In the second embodiment, since the groove-shaped space part 31 is disposed at the end side in the shaft inserting direction of the knurled portion 11, the fine foreign matter pushed to the end side in the shaft inserting direction through the grooves of the knurled portion 11 becomes sealed in the groove-shaped space part 31.

Therefore, the fine foreign matter does not disturb the press-fitting of the shaft 10 to a predetermined position by being caught between the end face of the rotor core 20 in the shaft inserting direction and the flange portion 15.

Accordingly, since the opening of the groove-like space part 31 is reliably covered by the press-fitting of the shaft 10 to the predetermined position, the fine foreign matter is sealed reliably in the groove-like space part 31.

According to the rotor 2 of the second embodiment configured as described above, the space part 30 partitioned by the outer peripheral surface of the small diameter portion 13 of the shaft 10 and the inner wall surface of the large diameter hole 24 of the rotor core 20 is disposed between the first stepped surface 12 of the shaft 10 and the second stepped surface 23 of the rotor core 20.

Thereby, since the foreign matter such as the shavings produced when the rotor core 20 is fitted and fixed to the outer circumferential surface of the shaft 10 by press-fitting are sealed in the space part 30, and no foreign matter is scattered during a rotation of the rotor 1, the same functions and effect as the first embodiment are accomplished.

Particularly, in the case of the second embodiment, the annular groove-shaped space part 31 that goes once around in the circumferential direction is disposed at a corner where an end face in the tip side in the shaft inserting direction of the flange portion 15 and the outer circumferential surface of the knurled portion 11 of the shaft 10 intersects.

Thereby, since the fine foreign matter pushed to the end side in the shaft inserting direction through the grooves of the knurled portion 11 can be sealed in the groove-shaped space part 31 reliably, it is possible to prevent the foreign matter from scattering reliably during the rotation of the rotor 1.

Other Embodiments

The present disclosure is not limited to the above embodiments and can be variously modified without departing from the scope of the present disclosure.

For example, although applying the rotor of the rotating electrical machine according to the present disclosure to a rotor of a vehicle motor has been described as an example of in the above embodiment, the present disclosure can be utilized also for a generator or an electric motor, and also for the rotary electric machine that can be used as both alternatively as the rotary electric machine installed in the vehicles.

What is claimed is:

1. A rotor of a rotating electrical machine comprising:
    a shaft having a knurled portion formed by applying knurling on an outer peripheral surface of the shaft; and
    a rotor core having a fitting hole that is fitted and fixed onto the outer peripheral surface of the shaft; wherein,
    defining a direction that the shaft is inserted into the fitting hole of the rotor core in an axial direction as a shaft inserting direction, the shaft includes the knurled portion on an end side in the shaft inserting direction, and the shaft includes a small diameter portion having a smaller diameter than a diameter of the knurled portion disposed in a tip side in the shaft inserting direction of the knurled portion via a first stepped surface;
    the rotor core includes a small diameter hole formed in a tip side end portion in the shaft inserting direction of the fitting hole and the small diameter hole is press-fitted onto the small diameter portion of the shaft, a large diameter hole having an inner diameter larger than an inner diameter of the small diameter hole and the large diameter hole is disposed in an end side in the shaft inserting direction of the small diameter hole via a second stepped surface, and a press-fitting portion that is press-fitted onto the knurled portion of the shaft and is formed on an end side end portion in the shaft inserting direction of the large diameter hole; and
    a space part partitioned by an outer peripheral surface of the small diameter portion of the shaft and an inner wall surface of the large diameter hole of the rotor core is disposed between the first stepped surface and the second stepped surface.

2. The rotor of the rotating electrical machine according to claim 1, wherein,
    the shaft includes a ring-shaped flange portion projecting outwardly in a radial direction in an end side in the shaft inserting direction of the knurled portion, and a groove-shaped space part is disposed at a position where an end face in a tip side in the shaft inserting direction of the flange portion and an outer circumferential surface of the knurled portion of the shaft intersects.

3. The rotor of the rotating electrical machine according to claim 1, wherein,
    the rotor core is formed by a plurality of steel plates that are laminated and connected in the axial direction.

4. The rotor of the rotating electrical machine according to claim 1, wherein,
    the volume of the space part is larger than a press-fitting applying margin volume between the knurled portion of the shaft and the rotor core.

5. The rotor of the rotating electrical machine according to claim 1, wherein,
    the knurled portion is formed in a tapered shape that gradually decreases its diameter toward a tip side in the shaft inserting direction.

* * * * *